United States Patent [19]
Crawford

[11] Patent Number: 5,996,612
[45] Date of Patent: Dec. 7, 1999

[54] APPARATUS FOR ELEVATING A METER ENCLOSURE COVER

[75] Inventor: Johnny W. Crawford, Jacksonville, Fla.

[73] Assignee: Jam Tite Corp., Jacksonville, Fla.

[21] Appl. No.: 09/027,529

[22] Filed: Feb. 23, 1998

Related U.S. Application Data

[60] Provisional application No. 60/039,249, Feb. 25, 1997.

[51] Int. Cl.⁶ .................................................. F16K 37/00
[52] U.S. Cl. ........................... 137/371; 137/364; 137/370
[58] Field of Search ............................... 404/26; 137/364, 137/371, 361, 377, 363, 367, 373, 370

[56] References Cited

U.S. PATENT DOCUMENTS

| | | | |
|---|---|---|---|
| 1,204,464 | 11/1916 | Lofton | 137/371 |
| 1,600,761 | 9/1926 | Haase | 137/364 |
| 2,099,479 | 11/1937 | Heinkel et al. | 137/367 |
| 3,390,224 | 6/1968 | Wyatt | 174/37 |
| 3,656,504 | 4/1972 | Topinka | 137/363 |
| 4,015,373 | 4/1977 | Boissier | 137/371 |
| 4,187,647 | 2/1980 | Hall | 52/20 |
| 4,976,568 | 12/1990 | Hess | 404/26 |
| 5,044,818 | 9/1991 | Pritchard | 404/26 |
| 5,221,155 | 6/1993 | Neil | 404/26 |
| 5,394,898 | 3/1995 | Turner | 137/371 |

*Primary Examiner*—A. Michael Chambers
*Attorney, Agent, or Firm*—Carlton Fields et al.

[57] ABSTRACT

The present invention is directed to an apparatus for elevating a cover for a meter enclosure that may be buried in the ground. The apparatus includes first and second coaxial, right circular cylinders, the first cylinder including a protruding member extending from its outer surface, with the second cylinder having a diameter greater than or equal to the diameter of the first cylinder and including a pair of spaced apart notches formed in the inner sidewall thereof. The first cylinder may be attached to the meter box, with the protruding member generally securing the apparatus to the enclosure and the enclosure cover may then be attached to the top of the second cylinder.

4 Claims, 5 Drawing Sheets

APPARATUS FOR ELEVATING A METER ENCLOSURE COVER

This application claims benefit of provisional application Ser. No. 60/039,249 filed Feb. 25, 1997.

BACKGROUND OF THE INVENTION

1. Field of the Invention

The present invention relates generally to an apparatus for elevating the height of an enclosure cover, such as is commonly used to cover a utility meter housing. Further, this invention relates to an apparatus to assist the irrigation, landscaping and utility industries to maintain access to meters that are buried in the ground.

2. Description of the Prior Art

It is well known that many utility companies bury meters in the ground, such as in sod boxes in residential communities, in order to protect such meters from the environment as well as to enhance the aesthetic quality of such communities. However, when the ground that surrounds such meters is landscaped, including the placement of sod and the growing of grass proximal to the meter enclosures, the covers for such enclosures often end up beneath the grade level of the surface and may become tilted or cockeyed. The ground around such meters has a tendency to shift and deteriorate, also causing the meter enclosures to fall below grade level.

A somewhat similar problem exists in a related field, namely the paving industry, where manhole covers need to be raised when new pavement is laid, and various solutions to this problem accordingly have been proposed. For example, U.S. Pat. No. 5,394,898 discloses a rectangular adjustable valve box cover having tapered side walls that may be stacked in order to accommodate different levels of street pavement. Similarly, U.S. Pat. No. 4,187,642 discloses a manhole extender ring system that includes a base ring to which additional extender rings may be attached in order to elevate a cast iron manhole cover, which system is held together by an adhesive material, such as caulking. Another such apparatus is disclosed in U.S. Pat. No. 4,976,568, which describes a device that includes a frame and a spacer ring that is clamped to the frame, such as by screws, in order to raise the level of the man hole cover when asphalt is layered on a road.

A study of such prior art devices readily leads one to the conclusion that many of such devices for the pavement industry are relatively complex, demand extremely heavy duty construction, or require the manufacture a plurality of different structures, which ultimately tend to increase the cost of such apparatus to the end user. Accordingly, there remains a great need in the art to provide an apparatus that will elevate a meter enclosure cover to grade level, which apparatus is not only of relatively simple construction, but also provides a durable and effective way of maintaining efficient access to such in ground meters.

SUMMARY OF THE INVENTION

In view of the foregoing it is an object of the present invention to provide an apparatus to elevate a meter enclosure cover above the meter enclosure. It is also an object of the present invention to provide an apparatus for elevating a meter enclosure cover substantially to grade level. Another object of the present invention is to provide an apparatus that is simple in construction and inexpensive to manufacture. Still another object of the present invention is to provide an apparatus for elevating a meter enclosure cover that is of selectable height, such as by stacking two or more such apparatus between the meter enclosure and the meter cover.

In order to achieve the foregoing objects as well as others that will become apparent to those skilled in the art, the present invention provides an apparatus for elevating the height of a meter enclosure cover to a predetermined level. The apparatus includes a first cylindrical portion having a generally right circular cylindrical side wall portion that has an outer surface, a top edge, a bottom edge, a central axis extending longitudinally through the first portion, an inner diameter, an outer diameter, with a protruding member extending a predetermined distance outwardly from the outer surface of the first cylindrical member, and the first cylindrical portion having a predetermined height. The apparatus also includes a second cylindrical portion having a generally right circular cylindrical sidewall portion substantially coaxial with the first cylindrical portion axis. The second portion also includes an inner diameter and an outer diameter, with the second portion inner diameter being equal to or greater than the first portion outer diameter, with a pair of spaced-apart notches formed radially outwardly in the second cylindrical portion sidewall portion, the second cylindrical portion being attached to and extending from a position proximal to the first cylindrical portion top edge, and with the first portion top edge defining at least a portion of a generally circular ledge within the second cylindrical portion, whereby attaching the first cylindrical portion to the meter enclosure and attaching the enclosure cover to the top edge of the second cylindrical member elevates the enclosure cover.

BRIEF DESCRIPTION OF THE DRAWINGS

A preferred embodiment of the present invention is illustrated in the drawings in which.

DESCRIPTION OF A PREFERRED EMBODIMENT

FIGS. 1–8 illustrate a preferred embodiment of the apparatus of the present invention. The present invention relates generally to a riser ring 10 primarily intended for elevating the height of a utility meter enclosure cover, or lid, generally indicated as 62 in FIGS. 7 and 8 to a predetermined level.

Figure 7:
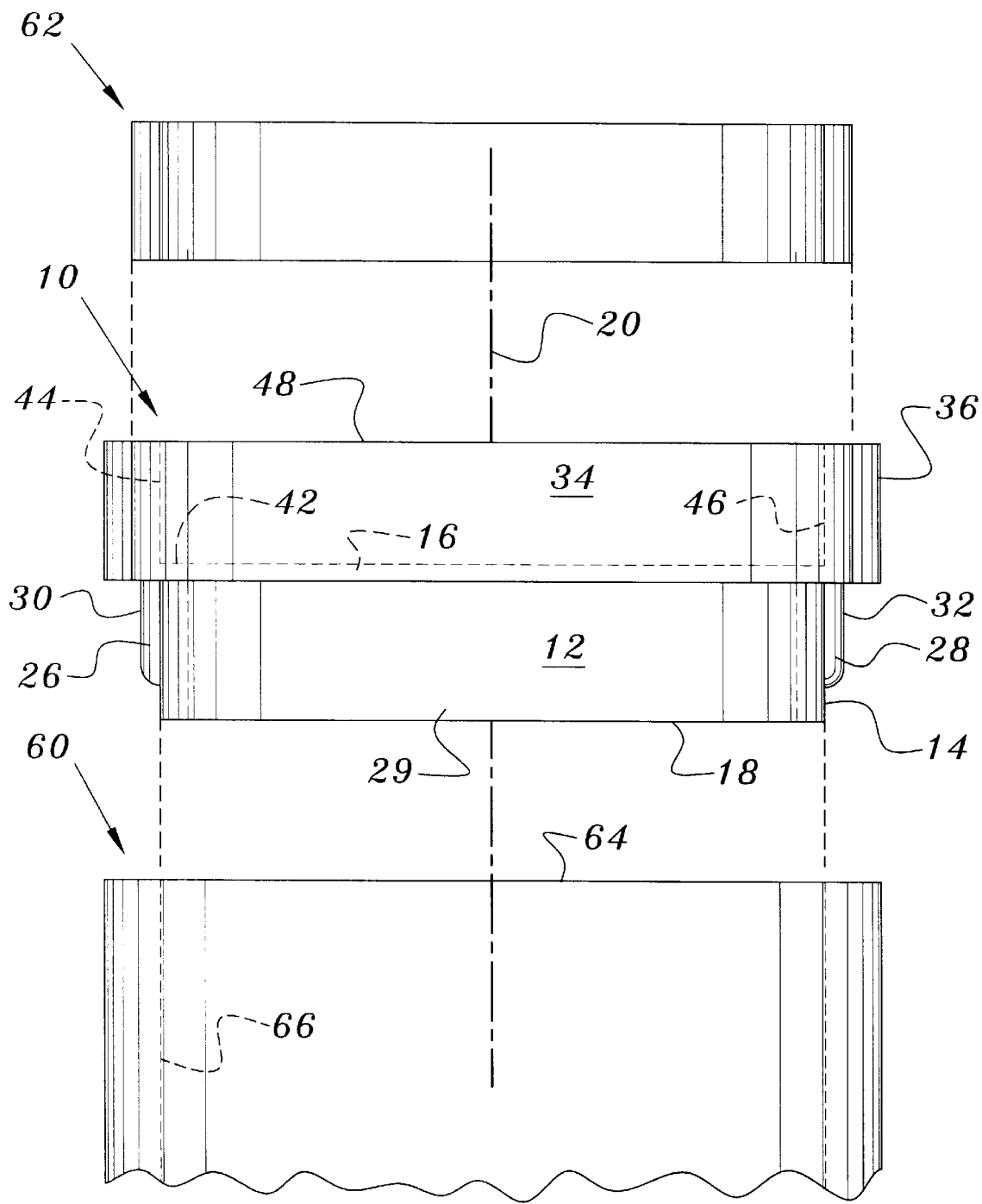
FIG. 7 is an exploded view of a side elevation of the apparatus of FIG. 1 illustrating a typical use with a meter enclosure, partially shown, and a cover.
Figure 8:
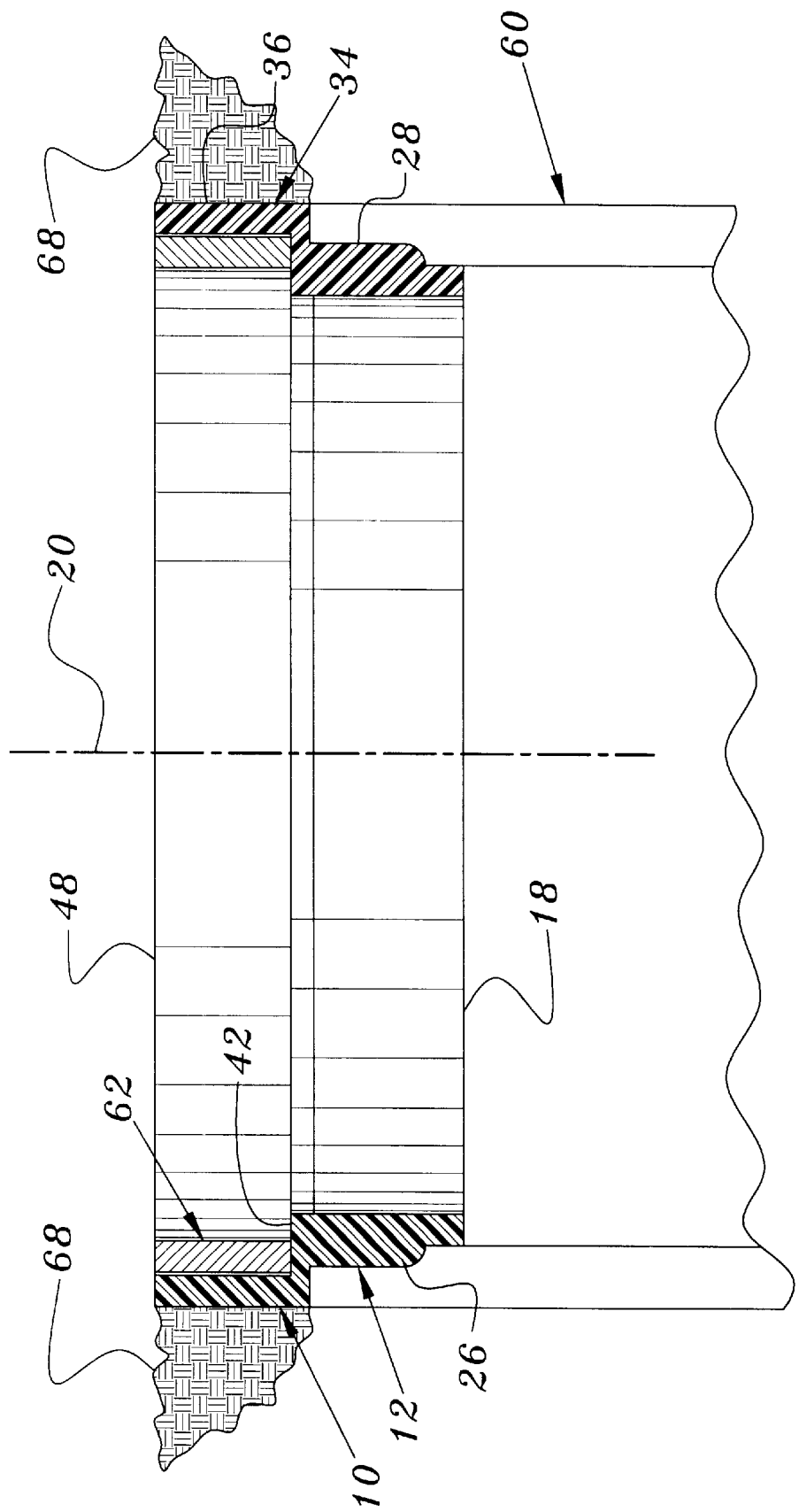
FIG. 8 is a schematic sectional view of the apparatus of the present invention effectively elevating a meter enclosure cover to grade level.

As shown in FIGS. 1–4, the preferred embodiment of this invention a first cylindrical portion 12 having a generally right circular cylindrical sidewall portion 14 with a predetermined thickness, suitably about 0.25 inches. First portion 12 has a top edge 16 and a bottom edge 18 that is substantially parallel to top edge 16 and spaced a predetermined distance therefrom. First cylindrical portion 12 also has a central axis 20 extending longitudinally through the first portion 12. The inner diameter 22 and the outer diameter 24 of first portion 12 are typically dimensioned and configured to correspond to the meter box to which riser ring 10 of the present invention is to attach, such that the first cylindrical portion 12 may be inserted into the meter enclosure 60, as schematically illustrated in the views of FIGS. 7 and 8. Preferably, the outer diameter 24 is about 0.5 inches larger than inner diameter 22, defining a generally uniform thickness of about 0.25 inches for portion 12.

Figure 1:
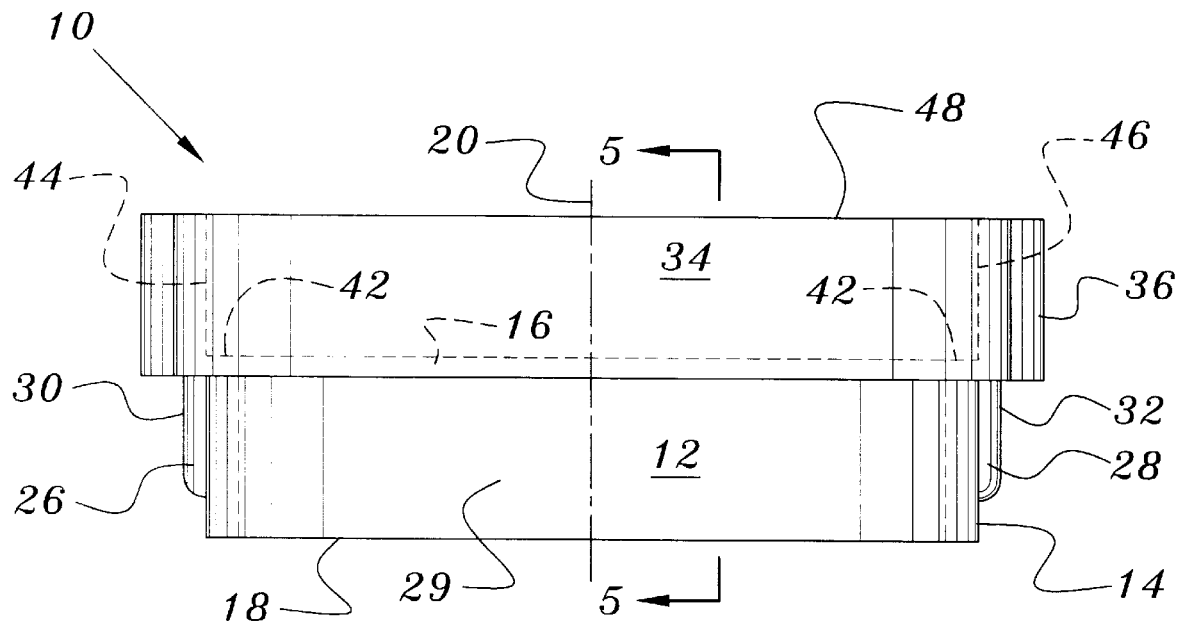
FIG. 1 is a side elevation of a preferred embodiment of the apparatus of the present invention.
Figure 2:
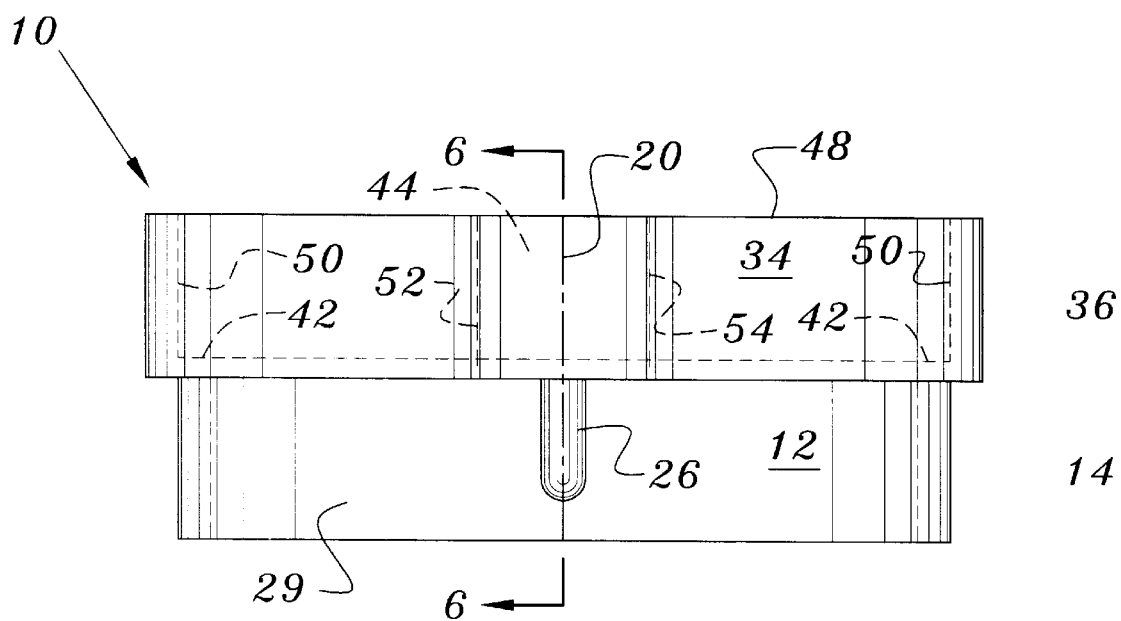
FIG. 2 is a side elevation of the apparatus of FIG. 1 rotated approximately 90 degrees about its central axis.
Figure 3:
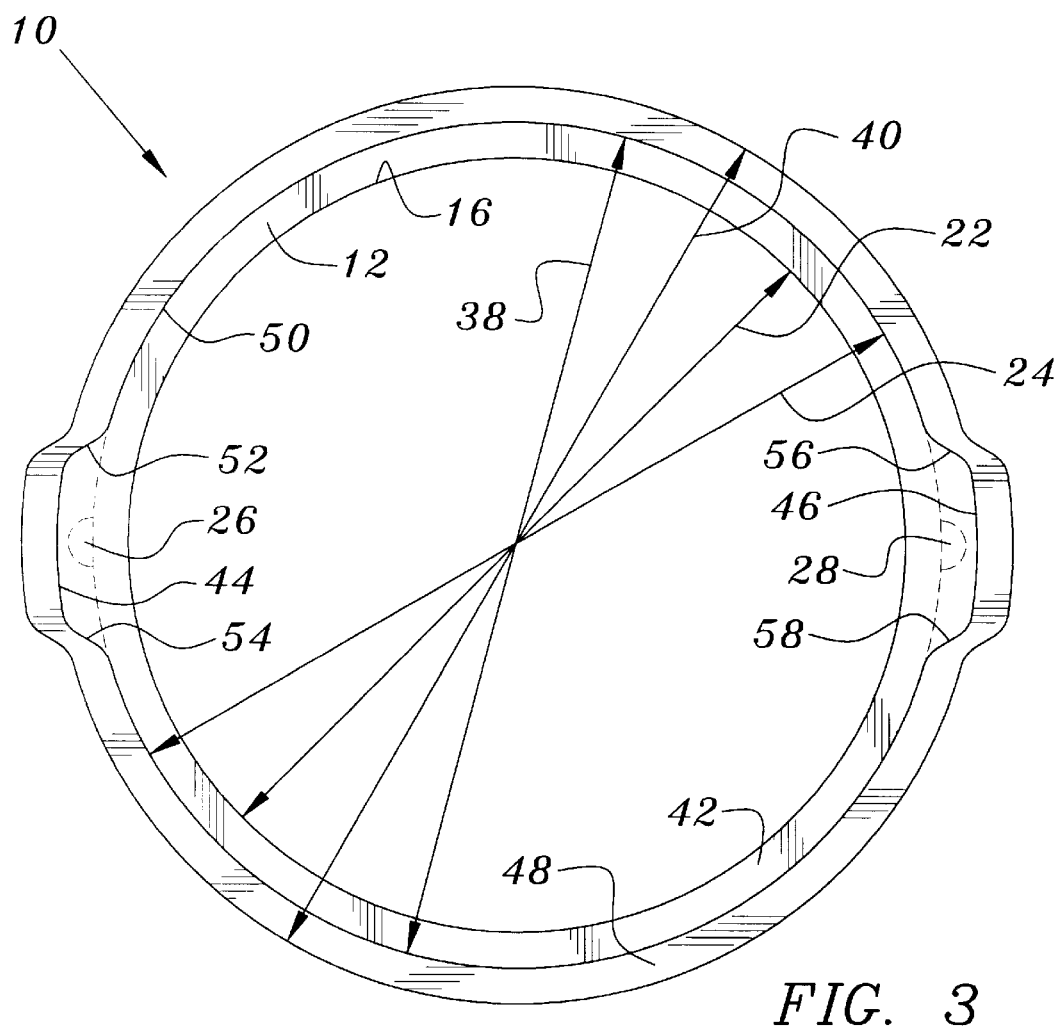
FIG. 3 is a top view of the apparatus of FIG. 1.
Figure 4:
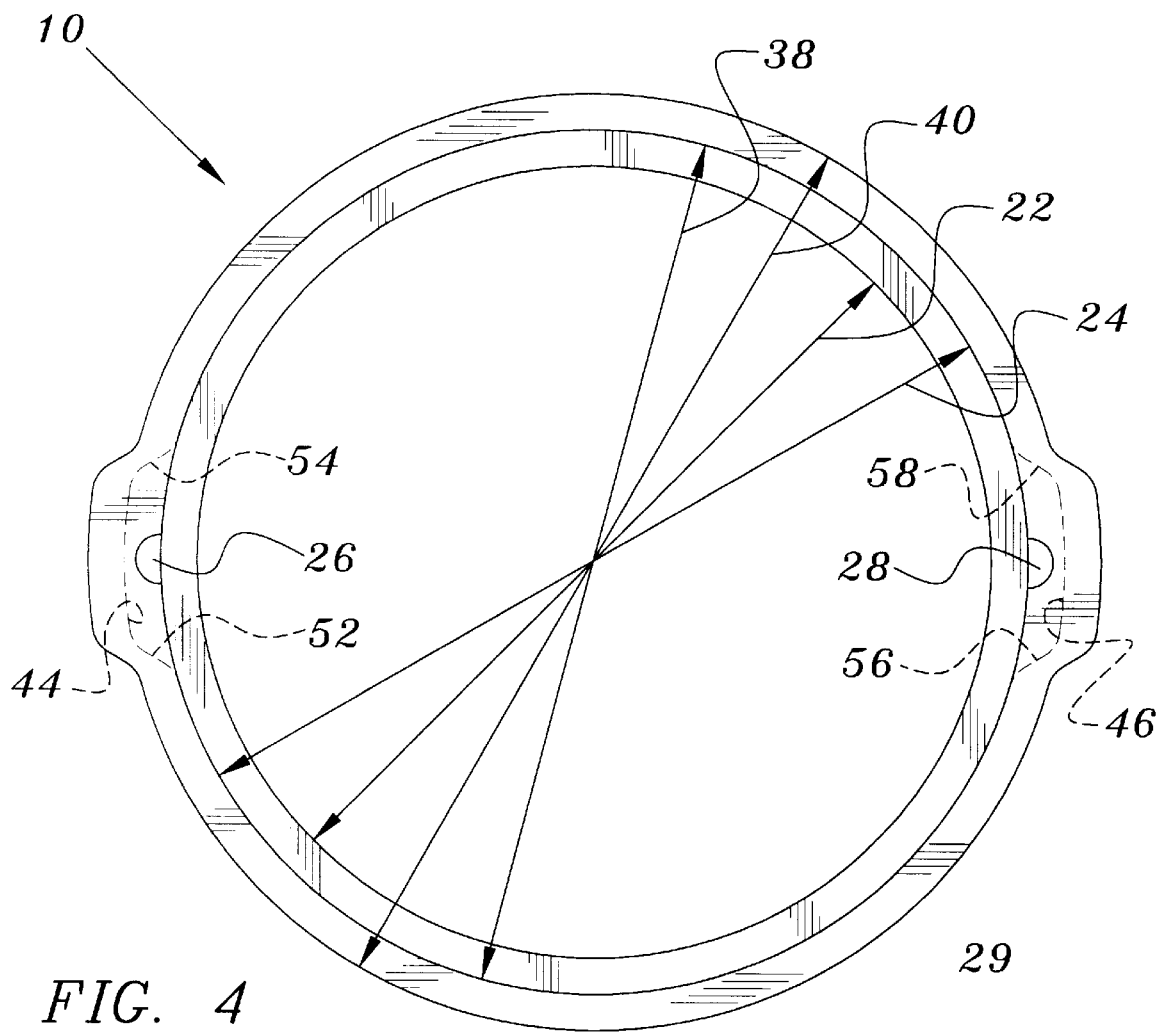
FIG. 4 is a bottom view of the apparatus of FIG. 1.
Figure 5:
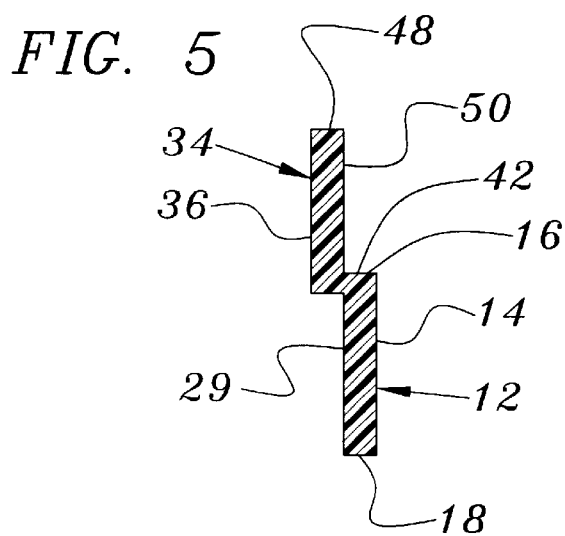
FIG. 5 is a side sectional view of the apparatus of FIG. 1 taken along line 5—5.
Figure 6:
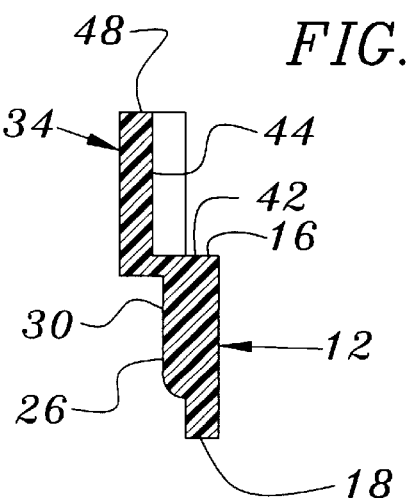
FIG. 6 is a side sectional view of the apparatus of FIG. 2 taken along line 6—6.

The first cylindrical portion 12 also includes a protruding member 26, and preferably a pair of spaced apart protruding members 26 and 28, that extend a predetermined distance, suitably about 0.125 inches, outwardly from the outer surface 29 of first cylindrical portion 12. While a pair of such protruding members are illustrated in the figures, it will be understood and appreciated by those skilled in the art that a greater number may also be used without departing from the present invention. Protruding members 26 and 28 extend outwardly from, and may suitably be integral with, generally opposed sides of the first cylindrical portion 12 outer surface 29, shown in FIGS. 3 and 4. Each protruding member comprises an elongated member, suitably having a length less that the height of first portion 12, positioned along the first portion outer surface 29 between top edge 16 and bottom edge 18. Each elongated member 26 and 28 preferably has a convex, or beveled, outer surface 30 and 32, respectively, as shown in FIGS. 3 and 4, between its side edges in order to facilitate the insertion of the riser ring 10 into a meter enclosure 60 or into another such riser ring.

The riser ring 10 of the present invention also includes a second cylindrical portion 34 similar to, but slightly larger than, first cylindrical portion 12. Portion 34 includes a generally right circular cylindrical sidewall portion 36 that is substantially coaxial with the axis 20. Portion 34 also has an inner diameter 38 and an outer diameter 40, with the second portion inner diameter 38 being at least equal to, and preferably about equal to, the first portion outer diameter 24. Second portion 34 is attached to and extends from first portion 12 at a position proximal to first portion top edge 16, such that the first portion top edge 16 defines at least a portion of a generally circular ledge 42 within the second portion, shown in FIGS. 4 and 5. Second portion 34 may preferably be integral with first portion 12, such as, for example, where riser ring 10 is produced by injection molding a thermoplastic resin material. Alternatively, second portion 34 and first portion 12 may also be separate members, with portion 34 attached to first portion 12, such as by attaching members 34 and 36 with a conventional adhesive material, clamps or other attachment mechanisms known in the art.

Portion 34 also includes a pair of spaced apart notches 44 and 46 formed in the inner surface of cylindrical sidewall portion 36 radially outwardly from axis 20. Preferably, notches 44 and 46 are formed in generally opposed sides of sidewall portion 36, with each notch extending generally longitudinally between the circular ledge 42 and the second member top edge 48. In addition, in order to facilitate the stacking of multiple riser rings 10 and the attachment of the container covers 62, the width of each notch 44 and 46 is preferably greater than the width of each protruding member 26 and 28. As shown in the preferred embodiment of FIGS. 3 and 4, the width of each notch 44 and 46 preferably tapers radially outwardly from the axis 20, such that the width of the portion of each notch 44 and 46 adjacent the second portion inner sidewall 50 is greater than the width of each notch 44 and 46 distal the second portion inner sidewall 50. Suitable such widths for notches 44 and 46 may include an inner width of about 1.375 inches tapering outwardly to an outer width of about 1.25 inches, defining a depth of about 0.25 inches. Of course, other notch widths and depths may be used with equal facility. It is also preferable that the side edges 52, 54, 56 and 58 of each notch 44 and 46, respectively, be curved between the inner sidewall 50 of member 34 and each notch 44 and 46, with each pair of side edges 52 and 54 as well as 56 and 58 extending between top edge 48 and ledge 42.

By the foregoing construction, and as shown in FIGS. 7 and 8, it will be apparent to those skilled in the art that the present invention provides a convenient apparatus for elevating a meter box lid, schematically illustrated as 62, to grade level, which is generally indicated as 68 in FIG. 8, where the enclosure opening 64 is below the intended grade 68. The apparatus 10 of the present invention may be positioned on top of a meter enclosure 60, with the first portion 12 inserted into the meter enclosure 60 and the enclosure cover 62 attached to the top edge 48 generally concentrically with portion 34. Accordingly, the dimensions and configurations of first portion 12 and second portion 34 should correspond to the enclosure opening 64 and lid 62, respectively. The riser ring 10 of the present invention may also be stacked onto a second substantially identical riser ring 10, such as by inserting the first portion 12 of a first riser ring into the second portion 34 of a second riser ring with the protruding members 26 and 28 aligned generally with notches 44 and 46. The top riser ring may then be rotated about axis 20 such that it generally locks in place due to the engagement between the protruding members 26 and 28 and the inner sidewall 50 of the lower ring.

Where a meter enclosure opening 64 becomes tilted with respect to grade level 68, the riser ring 10 of the present invention also provides an effective way to return the enclosure opening 64 to grade level 68. This may conveniently be accomplished by inserting a riser ring 10 into the enclosure opening 64, such that the protruding members 26 and 28 engage the inner side wall 66 of the enclosure 60 and the top edge of the second member is positioned substantially at grade level 68. By constructing the riser ring 10 to provide a tight fit between the protruding members and the enclosure inner wall, upper edge 48 of riser ring 10 may be adjusted to and maintain grade level 68. Of course, in circumstances where the tilt of the enclosure is severe or where the enclosure has dropped significantly below grade level 68, it may be necessary to utilize more than one riser ring 10, such as by stacking multiple rings.

While the foregoing describes a particularly preferred embodiment of the apparatus of this invention, it is to be understood that this description and the drawings is indicative only of the principles of the current invention and is not to be considered limitative thereof. Accordingly, because numerous variations and modifications of the invention, all within the scope of this invention, will readily occur to those skilled in the art, the scope of the invention is to be limited solely by the claims appended hereto.

What is claimed is:

1. A riser ring apparatus for elevating the height of a utility meter enclosure cover to a predetermined desired level, said apparatus comprising:

a first cylindrical portion having a generally right circular cylindrical sidewall portion, a top edge, a bottom edge, a central axis extending longitudinally through said first portion, an inner diameter, an outer diameter and an outer surface, with a protruding member extending a predetermined distance outwardly from said outer surface of said first cylindrical portion, said protruding member comprising an elongated member positioned along said first cylindrical portion outer surface between said top edge and said bottom edge of said first cylindrical portion, said elongated member having a beveled outer surface, and said first cylindrical portion having a predetermined height; and a second cylindrical portion having a generally right circular cylindrical sidewall portion substantially coaxial with said first cylindrical portion central axis, an inner diameter, an outer diameter, said second cylindrical portion inner diameter being at least equal to said first cylindrical portion outer diameter, with a pair of spaced apart notches formed radially outwardly in said second cylindrical portion sidewall portion, said second cylindrical portion having a top edge and being attached to said first cylindrical portion and extending from a position proximal to said first cylindrical portion top edge to said second cylindrical portion top edge, with said first cylindrical portion top edge defining at least a portion of a generally circular ledge within said second cylindrical portion, whereby attaching the first cylindrical portion to the meter enclosure and attaching the meter enclosure cover to the top edge of the second cylindrical portion increases the effective height of the enclosure and correspondingly elevates the enclosure cover.

2. An apparatus as in claim 1, wherein said protruding member extends a maximum of about 0.125 inch outwardly from said first cylindrical portion outer surface.

3. A riser ring apparatus for elevating the height of a utility meter enclosure cover to a predetermined desired level, said apparatus comprising:

a first cylindrical portion having a generally right circular cylindrical sidewall portion, a top edge, a bottom edge, a central axis extending longitudinally through said first portion, an inner diameter, an outer diameter and an outer surface, with a protruding member extending a predetermined distance outwardly from said outer surface of said first cylindrical portion, said first cylindrical portion having a predetermined height; and a second cylindrical portion having a generally right circular cylindrical sidewall portion substantially coaxial with said first cylindrical portion central axis, an inner diameter, an outer diameter, said second cylindrical portion inner diameter being at least equal to said first cylindrical portion outer diameter, with a pair of spaced apart notches formed radially outwardly in said second cylindrical portion sidewall portion, said second cylindrical sidewall portion having an inner surface, each said notch being formed in generally opposed sides of said second cylindrical portion inner surface, and having predetermined width, with said notch width being greater than the width of said protruding member, said width of each said notch adjacent said second cylindrical portion sidewall inner surface being greater than the width of each said notch distal said second cylindrical portion sidewall inner surface, such that the width of each said notch tapers radially outwardly from said second cylindrical portion sidewall inner surface, said second cylindrical portion having a top edge and being attached to said first cylindrical portion and extending from a position proximal to said first cylindrical portion top edge, with said first cylindrical portion top edge defining at least a portion of a generally circular ledge within said second cylindrical portion, each said notch extending generally between said circular ledge and said second cylindrical portion top edge, whereby attaching the first cylindrical portion to the meter enclosure and attaching the meter enclosure cover to the top edge of the second cylindrical portion increases the effective height of the enclosure and correspondingly elevates the enclosure cover.

4. An apparatus as in claim 3 wherein each said notch further comprises a pair of generally parallel side edges extending between said second cylindrical portion top edge and said first cylindrical portion top edge, with said notch side edges being curved between said notch and said second cylindrical portion sidewall inner surface.

* * * * *